Dec. 14, 1965  K. BRUECKER-STEINKUHL  3,223,357
AIRCRAFT PROPORTIONAL NAVIGATION
Filed June 12, 1962  2 Sheets-Sheet 1

INVENTOR
KURT BRUECKER-STEINKUHL

BY Toulmin & Toulmin
ATTORNEYS

INVENTOR
KURT BRUECKER-STEINKUHL

United States Patent Office 3,223,357
Patented Dec. 14, 1965

3,223,357
AIRCRAFT PROPORTIONAL NAVIGATION
Kurt Bruecker-Steinkuhl, Liesegangstr. 10,
Dusseldorf, Germany
Filed June 12, 1962, Ser. No. 202,943
Claims priority, application Germany, June 19, 1961,
B 62,953; June 25, 1961, B 63,393
3 Claims. (Cl. 244—14)

The purpose of this invention is to facilitate the guiding of aircraft toward moving objectives, and especially to introduce certain improvements into the method usually known as "proportional navigation" so as to adequately compensate for the aerodynamical and technical disturbances which are commonly encountered under actual flying conditions.

Proportional navigation is defined as a method of steering in which the angular velocity of the flight direction vector of the aircraft is proportional to the angular velocity of the line of sight from the aircraft to its objective. According to the usual and known method of proportional navigation, the angular velocity $\dot{\varphi}$ of the line of sight is measured, and is then multiplied in a navigation mechanism with the factor $k$, the so-called navigation constant. According to A. S. Locke, Guidance, Princeton, N.J., 1955, p. 475, the expressions in the specification "angular velocity of the line of sight" and "angular velocity of the flight-direction vector" are also physically equivalent to the expressions "rate of rotation of the line-of-sight from the missile to the target" and "rate of change of missile heading." In the ideal case set forth in FIGURE 1, it is assumed that the angular velocity $\dot{\gamma}$ of the flight direction vector can really be kept equal to the expression $k\dot{\varphi}$.

Figure 1:
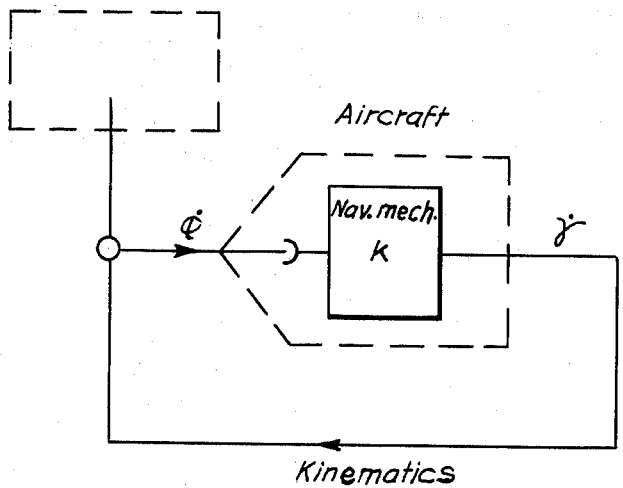
FIGURE 1 is a simplified diagrammatic view showing only the kinematics of aircraft steering.

The simplified version of FIGURE 1 is valid only in a case where consideration is given solely to the kinematics of the steering process. If other aerodynamical and technical influences are taken into consideration, then it will be found that the angular velocity $\gamma$ of the flight direction vector is not at all equal to $k\varphi$, but instead follows with a certain retardation the prescribed and variable command value. Such retardation is caused first by the aerodynamic or specific behavior of the aircraft, and second by the retarding members of the controlling and setting mechanism.

Figure 2:
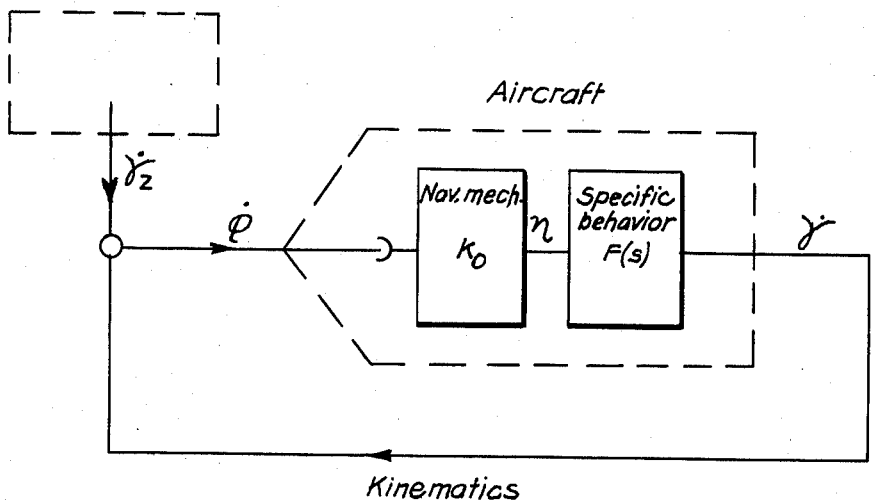
FIGURE 2 shows diagrammatically a navigation system in which the aerodynamic influences are taken into consideration.

FIGURE 2 sets forth the method of proportional navigation with consideration given to the aerodynamic influences. The angular velocity $\dot{\varphi}$ of the line of sight, which is picked up by the object-seeking head (a parabolic antenna), is multiplied in the navigation mechanism by the constant $k_0$, and is then fed into the steering control mechanism with a steering adjustment $\eta$. In doing so, it is assumed that the steering adjustment $\eta$ is proportional to the fed-in value $k_0\dot{\varphi}$. The angular velocity $\dot{\gamma}$ of the flight direction vector does not instantaneously follow the steering adjustment $\eta$, but because of the aerodynamic influences, will follow only with a certain delay, designated as "specific behavior" in the block in FIGURE 2. The expression "specific behavior" relates to the aerodynamic behavior of the airship. When the rudder is repositioned the airship will not immediately enter upon the course corresponding to the repositioned rudder but only after some delay. This delay is determined by aerodynamic influences. The angular velocity $\dot{\gamma}$ of the flight direction vector changes in turn the angular velocity $\dot{\varphi}$ of the line of sight, as has been indicated by feedback line designated "kinematic" on FIGURE 2. The new angular velocity $\dot{\varphi}$ of the line of sight, which is dependent not only on $\dot{\gamma}$ but also on $\dot{\gamma}_z$ (the angular velocity of the line of flight vector of the objective), will, as in the previous case, be taken over by the objective-seeking head, for processing in the airship. In the closed control circuit of FIGURE 2, the angular velocity $\dot{\varphi}$ of the line of sight corresponds to the magnitude of regulation, and the steering displacement $\eta$ to that of the setting. The navigation constant $k$ in the ideal case of FIGURE 1 corresponds here to a navigation factor which comprises a constant $k_0$ which is independent of the frequency, and a factor $$F(S) = \frac{1}{C_2.S^2 + C_1.S + 1}$$

which is, on the other hand, dependent on the said frequency.

By S. S. Chin, Missile Configuration Design, New York, 1961, p. 147, the aerodynamic transfer function is given as $$\frac{\dot{\gamma}}{\delta} = \frac{K}{S^2 + 2\xi\omega S + \omega^2} = \frac{K}{\omega^2} \cdot \frac{1}{\frac{S^2}{\omega^2} + \frac{2\xi}{\omega}S + 1}$$

The formula given in the application agrees with the formula of Chin if the aerodynamic static gain $K/\omega^2 = 1$ and if $\delta = \eta$. Also $C_2 = 1/\omega^2$ and $C_1 = 2\xi\omega$ where $\omega$ is the undamped natural frequency of the missile and $\xi$ is the damping constant. The expression F(S) depends upon $(S) = \delta + j\omega^*$. It is thus dependent upon the frequency. On the other hand the transfer function $\eta/\dot{\varphi} = k_0$ (see FIG. 2) is independent of the frequency. That means that the rudder displacement $\eta$ can be kept proportional to the measured angular velocity $\dot{\varphi}$.

A difficulty with the usual method of proportional navigation described above is that the stability of the method is relatively small, and especially when there is only a short distance between the aircraft and the objective. Investigations have shown that there is an upper limit of stability for the navigation factor constant, which may not be exceeded, for otherwise disturbing vibrations would be set up, and the aircraft would lose its objective. This upper limit of stability becomes less as the distance of the aircraft from the objective decreases. Hence because of stability considerations the navigation factor constant may not be given a very high value. For other technical reasons, to keep the line of flight as straight as possible, and to approach the constant bearing course, and to keep the transverse acceleration of the aircraft low, it would nevertheless be desirable to keep the navigation factor constant as high as possible.

The method according to this invention is therefore characterized in that the stability of the steering method, as compared with the usual steering methods, for the same value of the navigation factor constant, is greatly improved, so that the navigation factor constant may then be increased. It will therefore be possible to navigate the aircraft with adequate stability and thus increase the closeness of safe approach of the aircraft to its objective.

According to this invention, for steering the aircraft, different angular velocities are measured, namely that of the line of sight from the aircraft to its objective, and that of flight-direction vector of the aircraft.

The individual angular velocities are measured in the following manner as disclosed by A. S. Locke, Guidance, Princeton, N.J., 1955, pages 350–353:

(a) In the aircraft the antenna of the search head is rotatably suspended from a gyroscope and is therefore firmly held in the direction of the target. Every aberration of the line of sight introduces an error $\varepsilon$, which is converted into a command for adjustment of the antenna. The required antenna movement $\varepsilon A'$ to compensate for this error is then measured by means of a rate gyro. $\varepsilon A'$ is equal to the angular velocity $\dot\varphi$ of the line of sight.

(b) The angle $\gamma$ between the direction of flight and a stationary axis of reference is measured continually by a wind vane. By changing the direction of flight the velocity $\dot\gamma$ is determined directly in the airship according to one of the known constructions by means of a rate gyro. The relationships of the separate steps of this process are exemplified in FIGURE 3. The angular velocity of the line of sight multiplied by the constant $k$ represents a command value, with which the actual angular velocity $\dot\gamma$ of the line of flight vector is compared at the place N. The difference between these two values, namely between the command value and the actual value of the angular velocity of the line of flight vector, is fed into the steering control mechanism as a supplementary steering adjustment. Here it is again assumed that the steering adjustment $\eta$ is proportional to the fed-in value, which in this case is equal to a difference between angular velocities.

Figure 3:
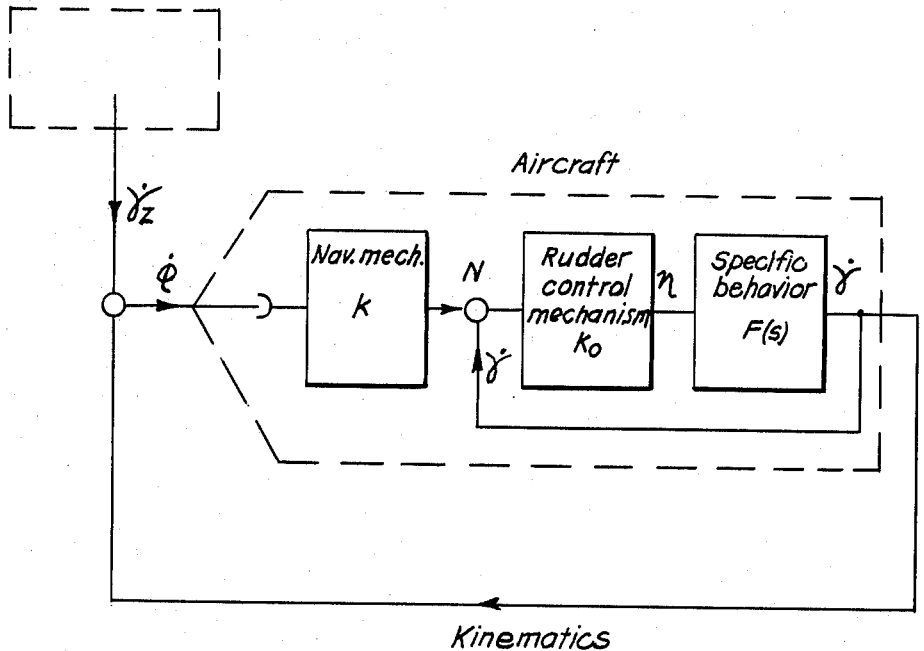
FIGURE 3 shows the improved system and its mode of operation in accordance with this invention.

The "fed-in value" is the value $(k\cdot\dot\varphi - \dot\gamma)$ at the input of the rudder command mechanism which controls the rudder displacement $\eta$, the latter being proportional to this input value, the proportionality factor being $k_0$. According to FIGURE 3, the measurement of the angular velocity of the direction of flight vector involves carrying back this angular velocity to the subtraction place N, as for instance with a feedback coupling. The feedback circuit that is inside and to the right of the aircraft in FIGURE 3 represents a supplementary control circuit, and the steering method according to this invention consists in this: that the angular velocity $\dot\gamma$ in the supplementary regulating circuit is fitted as closely as possible to the variable command values $k\cdot\varphi$ (angular velocities of the line of sight $\varphi$, multiplied by $k$) before the angular velocity $\dot\gamma$ in the main regulating circuit influences the angular velocity of the line of sight $\dot\varphi$ over the kinematic feedback. The command values of the main control circuit are influenced by angular changes in the line of sight, and therefore in the position of the objective, as well as by the reaction from the supplementary control circuit. The method of this invention therefore differs from the usual methods in that there is built into the main control circuit a supplementary control circuit with feedback coupling.

In FIG. 3, the main control circuit is that which exists when the connecting line leading from the output of the "specific behavior" block to the point N is removed. The navigation factor of the circuit in FIGURE 3 comprises moreover a constant that is independent of the frequency and here, with reference to the feedback, is expressed as $$k\frac{k_0}{1+k_0}$$

as well as a factor that is dependent of the frequency $$F'(S) = \frac{1}{C_2'\cdot S^2 + C_1'\cdot S + 1}$$

in which the values $C_2'$ and $C_1'$ corresponding to the feedback, are strongly distinguished from the values $C_2$ and $C_1$. By "navigation factor" is understood the static amplification of the open regulating circuit. The static amplification of the regulating circuit shown in FIGS. 1–3 is therefore given by (Fig. 1) $\quad k$ (Fig. 2)

$$k_0\cdot F(S) = k_0\cdot\frac{1}{C_2\cdot S^2 + C_1\cdot S + 1} \to k_0 \text{ for } S\to 0$$

(Fig. 3)

$$k\cdot\frac{k_0\cdot F(S)}{1+k_0\cdot F(S)} = k\cdot\frac{k^0\cdot\dfrac{1}{C_2\cdot S^2+C_1\cdot S+1}}{1+k_0\cdot\dfrac{1}{C_2\cdot S^2+C_1\cdot S+1}}$$

$$= k\cdot\frac{k_0}{C_2\cdot S^2+C_1\cdot S+1+k_0} =$$

$$k\cdot\frac{k_0}{1+k_0}\cdot\frac{1}{\dfrac{C_2}{1+k_0}\cdot S^2+\dfrac{C_1}{1+k_0}\cdot S+1} \to k\cdot\frac{k_0}{1+k_0} \text{ for } S\to 0$$

The following relations will therefore hold true:

(Fig. 2) $\quad k_0\cdot\dfrac{1}{C_2\cdot S^2+C_1\cdot S+1} = k_0\cdot F(S)$ (Fig. 3)

$$k\cdot\frac{k_0}{1+k_0}\cdot\frac{1}{\dfrac{C_2}{1+k_0}\cdot S^2+\dfrac{C_1}{1+k_0}\cdot S+1} = k\cdot\frac{k_0}{1+k_0}\cdot F'(S)$$

where $$F'(S) = \frac{1}{C_2'\cdot S^2+C_1'\cdot S+1}$$

with $$C_2' = \frac{C_2}{1+k_0},\ C_1' = \frac{C_1}{1+k_0}$$

This difference influences stability in such a manner that the upper limit of stability for the navigation factor constant, with this invention is much higher than with the usual steering methods of proportional navigation. The navigation factor constant or the strengthening of the navigating mechanism according to this invention is so chosen that the upper limit of stability of the constant will not be exceeded until the aircraft is only a short distance from its objective, and that up to that point the airship will be stable during steering. Further explanation of the above formulas is as follows: At the mixing point N in FIG. 3 the ingoing and outgoing values are given by the formula:

$$\frac{\dot\gamma}{k_0\cdot F(S)} = -\dot\gamma + k\cdot\dot\varphi$$

from which the transfer function is obtained as follows:

$$\frac{\dot\gamma}{\dot\varphi} = k\frac{k_0\cdot F(S)}{1+k_0 F(S)} = k\frac{k_0}{1+k_0}\cdot\frac{1}{C_2'\cdot S^2+C_1'\cdot S+1}$$

The equations for the regulating circuit can be set up from FIGS. 2 and 3 either with or without the supplementary regulating circuit, whereby approximate expressions will be used for the kinematics. As is customary with such regulating circuit calculations, the necessary conditions for stability for the strengthening or for existing navigation factor can be set up with the help of the stability criterion of Hurwitz. After extensive calculation, the following condition is arrived at for the regulating circuit of FIG. 2:

(I) $\quad \dfrac{\lambda\zeta\omega}{p}\left[1+\dfrac{a}{\omega^2(1+k_0)}(\lambda\zeta\omega-a)\right] > k_0\dfrac{k_0}{1+k_0} > \dfrac{a}{p}$ and for the navigation factor of the regulating circuit with the supplementary regulating circuit of FIG. 3, the following condition (II) $\quad \dfrac{\lambda\zeta\omega}{p}\left[1+\dfrac{a}{\omega^2(1+k_0)}\cdot(\lambda\zeta\omega-a)\right] > k\dfrac{k_0}{1+k_0} > \dfrac{a}{p}$ with $$p = \frac{v\cos\delta}{\gamma}$$

and $$a = \frac{2}{\gamma}(v \cos \delta - v_z \cos \delta_z)$$

where $r$ = distance of airship from objective
$v$ = velocity of airship
$v_z$ = velocity of objective The two formulae differ by the factor $(1+k_0)$ which occurs in the denominator of one of the terms of Formula II. Hence, the limiting value at the left of Formula II is larger than the corresponding expression of Formula I. That means that the navigation factor can assume higher values in II than in I without the guiding circuit becoming unstable. Since $$\frac{\lambda \zeta \omega}{p} = \frac{\lambda \zeta \omega}{v \cos \delta}$$

the upper limit of stability is approximately proportional to the distance $r$. Hence for a certain value of $$k \cdot \frac{k_0}{1+k_0}$$

between about 3 to 5, the upper limit is exceeded only for low values of $r$. Instabilities and disturbing oscillations in the guiding circuit can then have only little effect, and the distance of the airship from the objective while passing the latter, namely, the "miss-distance," is much reduced. All of these results have been confirmed by electronic computers with actual numerical trajectory calculations.

Since differences between the command and actual values of the angular velocity of the flight direction vector are promptly received by the supplementary control circuit and used for influencing the aircraft, the elimination of a disturbance or of a deviation from the command value can follow more quickly and more directly. Investigations have shown that in consequence thereof the line of flight under adverse conditions will suffer less disturbance, and that the miss distance will be much reduced. The advantage of the invention therefore consists briefly in this, that there is improved stability during steering, that there is less disturbance of the line of flight, that the miss-distance is reduced, and that the chances of reaching the objective are much improved.

The measurement of angular velocities is sometimes more difficult than the measurement of angles. It may therefore be preferable to use angular measurements rather than angular velocity measurements. In the known process of proportional navigation, the angular velocity of the line of sight is measured with gyroscopic devices as shown by A. S. Locke, Guidance, Princeton, N.J., 1955, pages 350–353. The measurement of the angular velocity of the flight path vector of the aircraft is made in a similar manner. Another feature of this invention is that measurements are first made of the angles which the line of sight and the line of flight make with a stationary reference line, and the difference between these two angles is then delivered to the steering command mechanism to help regulate the same. At the same time this angular difference is differentiated in a differentiator which is associated with the steering command mechanism, and is therein converted into the desired angular velocity difference. As stated above, continuous measurements can be made of angle $\varphi$ of the line of sight by the trailing of the antenna, and also of the angle $\gamma$ by the flight direction indicator. After translation of the angular measurements inot electric voltages, the difference $(k \cdot \varphi - \gamma)$ and in an electric differentiator of known construction the value $(k \cdot \dot{\varphi} - \dot{\gamma})$ namely, the angular velocity difference, is formed. This subsequent differentiation of the angular velocity difference has the advantage in that initially it is only the angles and not the angular velocities that need to be measured, and that the differentiation can thereafter be carried out in a fixed network which in some cases may be formed entirely of resistors and capacitors. As a stationary line of reference, against which the angular positions of the line of sight and the line of flight are measured, it is preferable to use a line that is specially provided for that purpose. The "stationary line of reference" is a line in a fixed position in space. It can pass for example through a gyroscopic axis.

The angular velocity $\dot{\varphi}$ which is measured in the manner above described is converted into an electric voltage and is delivered to an electric amplifier. By means of the amplification regulator of this navigation amplifier the value $k$ is suitably fixed and introduced.

In accordance with the lowering of the limit of stability for the navigation factor, such factor can be higher at greater distances of the aircraft from its objective than at smaller distances. According to a further feature of this invention the amplification of the navigation mechanism (factor $k$) is not maintained constant but changes during flight, especially during the lowering of the upper limit of stability the amplification is reduced. The navigation factor of this invention is given by $$k \cdot \frac{k_0}{1+k_0}$$

This expression will change in value when, with $k_0$ remaining constant, the factor $k$ changes; $k$ is equivalent to the electric amplification of the navigation mechanism. This amplification is controlled as set forth below.

The changing or controlling of the amplification can conform to a prescribed program, according to which the upper stability limit during the normal flight procedure will be surpassed only after close approach of the aircraft to its objective. The changing or controlling of the amplification does not always need to follow a fixed program, but can be varied according to a measurable factor. It is especially advantageous according to this invention, to measure, during flight, the distance of the aircraft from the objective, and to regulate the amplification in accordance with this measurement. The measurement of the distance of the airship from the objective is preferably made by determination of the time of travel of an electric impulse which is radiated from the airship and after reflection from the objective is received by the airship by known means. The advantage of such a measurement is that the amplification can then be kept as high as possible, but always within the limits of stability. In this manner the aircraft can be steered with stability as close as possible to the objective.

The upper limit of stability for the amplification or the navigation factor constants, is inversely proportional to the speed of the aircraft. Hence to additionally increase the stability of the process at smaller distances, provision is made for reducing the aircraft speed upon close approach to its objective. The velocity of the airship can be reduced by the release of braking surfaces positioned in the path of the air current by known means. This reduction of speed, as well as a corresponding change of amplification, can be effected either in accordance with a prescribed time-controlled program or according to a variable factor, especially to the measured distance of the aircraft from its objective.

In FIGURE 2 the adjustment $\eta$ and also the angular velocity $\dot{\gamma}$ is proportional, up to a certain limit, to the adjustment $\dot{\varphi}$, whereas in proportional navigation there is a proportional regulation which inherently introduces a continual error. The result of this is that the velocity of the line of sight $\dot{\varphi}$ cannot be returned to its command value zero during continual maneuvering of the objective, but will receive a residual deviation. By continually changing the angular direction of the objective, by maneuvering the line of sight will also change its position in space. The transverse acceleration of the aircraft will be smaller as the deviation of the velocity of the line of sight from the command value zero is smaller. Since the transverse acceleration to which the aircraft subjects itself must not exceed a certain value, it is therefore essential that any residual deviation should be kept as small as possible.

In proportional regulation the residual deviation becomes smaller when the static amplification; or in the case of proportional navigation, the navigation factor; is increased. Nevertheless there are limits to the increase of static amplification or of the navigation factor, since with increasing amplification the yawing tendency and the danger of exceeding the upper limit of stability are increased.

According to another feature of this invention it is advantageously possible, without any increase of the navigation factor, to completely eliminate any residual deviation of the steering process during uniform motion. For this purpose, after measurement of the angular velocity of the line of sight, there is produced in the navigation mechanism also the integral value of this angular velocity. Both values, namely the measured angular velocity of the line of sight and the corresponding integral value, are multiplied with different suitably selected constants, and thus adequately amplified. In the usual proportional navigation the measured angular velocity $\dot{\varphi}$ is multiplied by the factor $k$, which means that an electric signal of the value $k \cdot \dot{\varphi}$ is produced and delivered to the rudder command mechanism. In accordance with this invention, after measurement of $\dot{\varphi}$, in the navigation mechanism the integral $\int \dot{\varphi} dt$ is also formed and multiplied by a second factor $k_1$ so that there will then be produced a second signal of the magnitude $k_1 \cdot \int \dot{\varphi} dt$. The sum of the two signals $(k \cdot \dot{\varphi} + k_1 \cdot \int \dot{\varphi} dt)$ is delivered to the rudder command mechanism. The factor $k_1$ is chosen about equal to $k$. The summation value of both of these adequately amplified values is then produced, and is delivered to the command mechanism for steering adjustment. The essential feature here is the integration of the angular velocity of the line of sight, and the improved method can therefore be designated as "Proportional Integral Navigation."

It may also be advantageous, for the purpose of stability, after measurement of the angular velocity of the line of sight, to produce in the navigation mechanism also the differential quotient of this angular velocity, to be used for steering the aircraft. In this case the summation value is produced in the navigation mechanism from (1) the angular velocity of the line of sight multiplied by a first constant, and (2) the differential quotient multiplied by a second constant. The summation value is fed into the mixer station of the steering command mechanism. After measurement of $\dot{\varphi}$, the differential quotient of $\dot{\varphi}$, namely $d\dot{\varphi}/dt = \ddot{\varphi}$ is formed and is multiplied by a second factor $k_2$. The sum of the two signals $(k \cdot \dot{\varphi} + k_2 \cdot \ddot{\varphi})$ is delivered to the rudder command mechanism.

Alternatively the summation value which is to be used for influencing the steering command mechanism may also be produced in the navigation mechanism from three values, namely (1) the angular velocity of the line of sight multiplied by a first constant, (2) the integral value multiplied by a second constant, and (3) the differential quotient multiplied by a third constant. As already mentioned, the measured angular velocity $\dot{\varphi}$ is converted by the navigation mechanism into an electric voltage. From the continuously adjusted voltage the integrated value of $\dot{\varphi}$ or the differential quotient of $\dot{\varphi}$ can be formed by an electric integrator or differentiator of known construction. The integral values or differential quotients thus obtained are again converted into electric voltages which are strengthened in subsequent amplifiers or multiplied by a constant. The various voltages can be added in any known prescribed manner.

The constants or the amplifications, of integral value, and of the differential quotient, are chosen in such a manner that the upper limits of stability of these constants will not be exceeded up to close approach to the objective.

Since the stability limits of these constants drop from high values to low values as the distance of the aircraft from its objective diminishes, it is furthermore contemplated in this process to change these constants during flight, especially from higher values to lower values, which may be done either in accordance with a time schedule or corresponding to the flight, and preferably after measurement of the distance of the aircraft from the objective. The factors $k$, $k_1$ and $k_2$ correspond to the amplifications by amplifiers to which the values $\dot{\varphi}, \int \dot{\varphi} dt, d\dot{\varphi}/dt$ are delivered. To change the values of the factors $k, k_1, k_2$, it is only necessary to change the amplification of these amplifiers by means of variable potentiometers.

Figure 4:
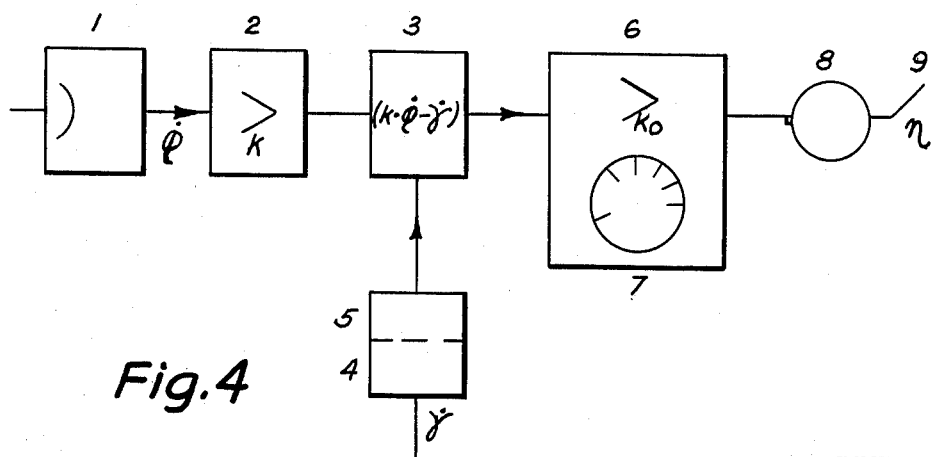
FIGURE 4 shows diagrammatically the essential parts of the control apparatus in their operative relationship to each other.

The process of this invention is illustrated by the example in FIGURE 4 which shows the essential elements of an aircraft which are necessary for performing the steering process of this invention. For better clarification, all details which are not necessary for an understanding of this invention have been omitted.

In FIGURE 4 the objective seeking head or parabolic antenna 1 serves to receive and measure the angular velocity $\dot{\varphi}$ of the line of sight. As previously explained, that angular velocity $\dot{\varphi}$ is measured by the trailing of the antenna. This measured angular velocity, after being converted into a corresponding electric voltage, is then fed into the amplifier 2 to be multiplied by an amplification constant $k$. The value $k\dot{\varphi}$ is then passed from 2 to the mixer station 3. The direction of flight of the aircraft $\gamma$ is then measured by a wind vane 4. From the currently measured value $\gamma$, the angular velocity $\dot{\gamma}$ is obtained by differentiation, and after being converted into an electric potential, is led into the mixer station 3. In this mixer station 3 there is obtained the difference between the command value $k\dot{\varphi}$ and the actual value $\dot{\gamma}$, which difference is then delivered to the amplifier 6, in which this difference is further amplified by the factor $k_0$. The amplification $k_0$ is produced by adjustment of the variable amplification control 7. From the amplifier 6, the adequately amplified voltage difference is fed to the servomotor 8 for adjustment of the rudder 9, and the direction of flight of the aircraft thus controlled. Blocks 1 and 2 contain the navigation mechanism, and block 6 the steering command mechanism.

The method of this invention is however not to be limited by the illustrated examples.

What is claimed is:

1. In an aircraft having steering mechanism and servomotor means for adjusting the steering mechanism to direct the aircraft toward an objective, a regulating apparatus on the aircraft for improving the proportional navigation of the aircraft comprising: means for measuring the angular velocity of the line of sight from the aircraft to an objective and for converting the measurement into a first electric potential; means for measuring the angular velocity of the direction of flight of the aircraft and for converting the measurement into a second electrical potential; means for multiplying said first electrical potential by an arbitrary constant to provide a command value; a mixer station having means for measuring the difference between said second electrical potential and said command value; and means for amplifying said difference and feeding it to said servomotor means for adjusting said steering mechanism.

2. In an aircraft having steering control mechanism and servomotor means for adjusting the steering mechanism to direct an aircraft toward an objective, a regulating apparatus on the aircraft for improving proportional navigation of the aircraft comprising: means for measuring the angular velocity of the line of sight from the aircraft to an objective and for converting the measurement into a first electric potential; means for measuring the angular velocity of the direction of flight of the aircraft and for converting the measurement into a second electrical potential; means for determining the distance of the aircraft from its objective and for converting the measurement into a variable value; means for reducing said variable value as the aircraft approaches its objective, variable amplification means for multiplying said first electrical potential by said variable value to provide a command value; a mixer station having means for measuring the difference between said second electrical potential and said command value; means for amplifying said difference and feeding it to said servomotor means for adjusting said steering mechanism with the adjustment thereof being proportional to said difference.

3. In an aircraft having steering mechanism and servomotor means for adjusting the steering mechanism to direct the aircraft toward an objective, a regulating apparatus on the aircraft for improving proportional navigation of the aircraft comprising: means for establishing a reference line in a fixed position in space; means for measuring the angle of the line of sight from the aircraft to an object with respect to said reference line and for converting the measurement into a first electric potential; means for measuring the angle of the direction of flight with respect to said reference line and for converting the measurement into a second electric potential; means for multiplying said first electric potential by a constant factor to provide a command value; means for differentiating the difference between said command value and said second electric potential to obtain an angular velocity difference; and variable amplification means for multiplying said angular velocity difference by a constant and for feeding it to said servomotor.

References Cited by the Examiner

UNITED STATES PATENTS

| | | | |
|---|---|---|---|
| 2,463,362 | 3/1949 | Doll | 250—230 X |
| 2,992,423 | 7/1961 | Floyd et al. | 244—14 |
| 3,083,666 | 4/1963 | Agins | 244—14 |

BENJAMIN A. BORCHELT, *Primary Examiner.*

SAMUEL FEINBERG, *Examiner.*

UNITED STATES PATENT OFFICE
CERTIFICATE OF CORRECTION

Patent No. 3,223,357                      December 14, 1965

Kurt Bruecker-Steinkuhl

It is hereby certified that error appears in the above numbered patent requiring correction and that the said Letters Patent should read as corrected below.

Column 1, line 49, for "$\gamma$" read -- $\dot{\gamma}$ --; line 50, for "$k\varphi$" read -- $k\dot{\varphi}$ --; column 2, lines 17 and 18, for that portion of the formula reading "C2.S$^2$" read -- $C_2 S^2$ --; lines 25 and 26, for that portion of the formula reading $$\frac{K}{S^2 + Z\xi\omega S +} \quad \text{read} \quad \frac{K}{S^2 + 2\xi\omega S +}$$

column 3, lines 37 and 38, for "$\varphi$", each occurrence, read -- $\ddot{\varphi}$ --; column 4, lines 1 to 6, for that portion of the formula reading "k$^0$" read -- $k_0$ --; column 5, line 7, for "$\upsilon$" read -- $v$ --; line 8, for "$\upsilon_z$" read -- $v_z$ --; column 7, line 28, for "$\int\varphi dt$" read -- $\int\dot{\varphi}dt$ --; line 51, for "$\varphi$", second occurrence, read -- $\ddot{\varphi}$ --; line 52, for "$(k\cdot\dot{\varphi}+k_2\cdot\dot{\varphi})$" read -- $(k\cdot\dot{\varphi}+k_2\cdot\ddot{\varphi})$ --; column 8, line 29, for "value $\dot{\gamma}$" read -- value $\dot{\gamma}$ --.

Signed and sealed this 20th day of December 1966.

(SEAL)
Attest:

ERNEST W. SWIDER                              EDWARD J. BRENNER
Attesting Officer                               Commissioner of Patents